United States Patent [19]

Hultberg

[11] Patent Number: 5,195,370
[45] Date of Patent: Mar. 23, 1993

[54] AUTOMOTIVE WHEEL BALANCING APPARATUS AND METHOD

[75] Inventor: Richard M. Hultberg, Vienna, Va.

[73] Assignee: Ann Hultberg, executrix

[21] Appl. No.: 719,434

[22] Filed: Jun. 24, 1991

Related U.S. Application Data

[63] Continuation of Ser. No. 139,124, Dec. 23, 1987, Pat. No. 5,025,662, which is a continuation of Ser. No. 502,986, Jun. 10, 1983, abandoned.

[51] Int. Cl.$^5$ .................................................. G01M 1/22
[52] U.S. Cl. ........................................ 73/459; 73/462
[58] Field of Search ................ 73/459, 460, 461, 462, 73/458, 466, 467, 487

[56] References Cited

U.S. PATENT DOCUMENTS

| | | | |
|---|---|---|---|
| 3,130,587 | 4/1964 | Kinsey et al. | 73/462 |
| 3,289,483 | 12/1966 | Slemmons | 73/459 |
| 4,507,964 | 4/1985 | Borner et al. | 73/462 |

Primary Examiner—John E. Chapman
Attorney, Agent, or Firm—Jim Zegeer

[57] ABSTRACT

Dynamic wheel balancing is achieved at low (1–3 RPS) rotating velocity by mounting the wheel for rotation on a frame which is pivotally supported for any rotation caused by wheel unbalance. A transducer senses any frame movement and electrical signals corresponding to the maximum amplitude is produced by the transducer which signals are converted to indications of the amount of weight needed to balance the wheel and the location thereof.

2 Claims, 10 Drawing Sheets

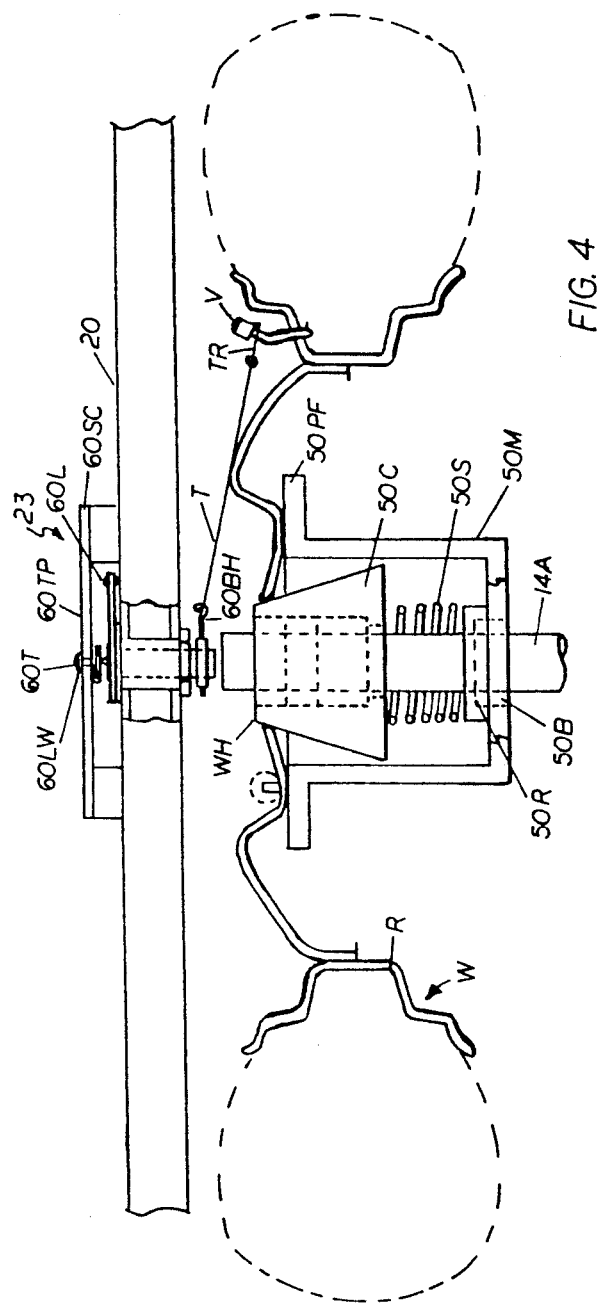
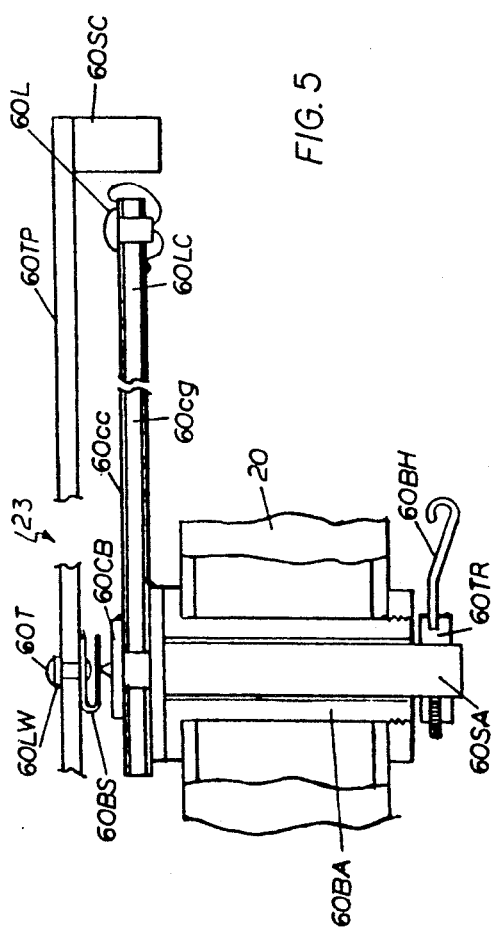
FIG. 4
FIG. 5

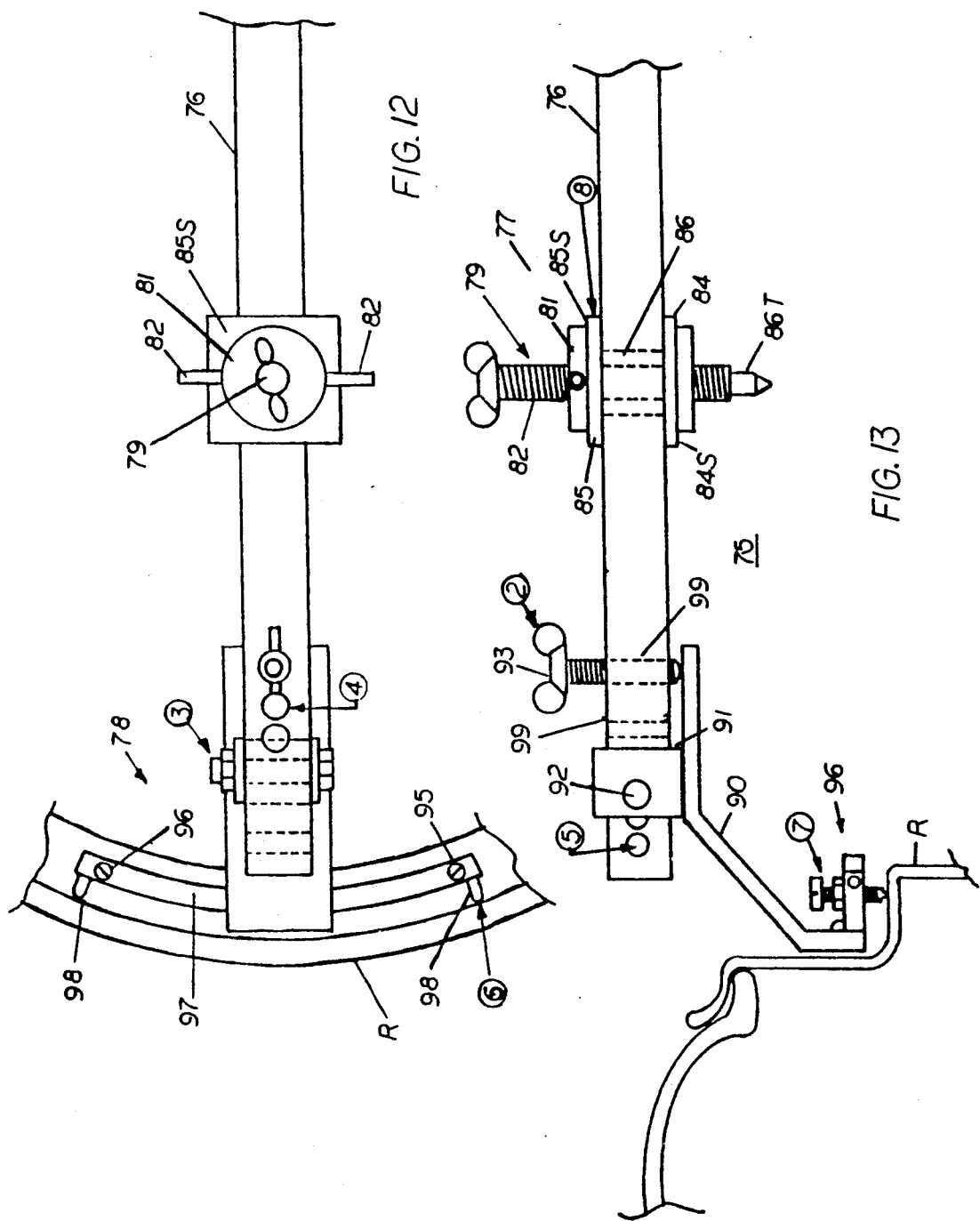

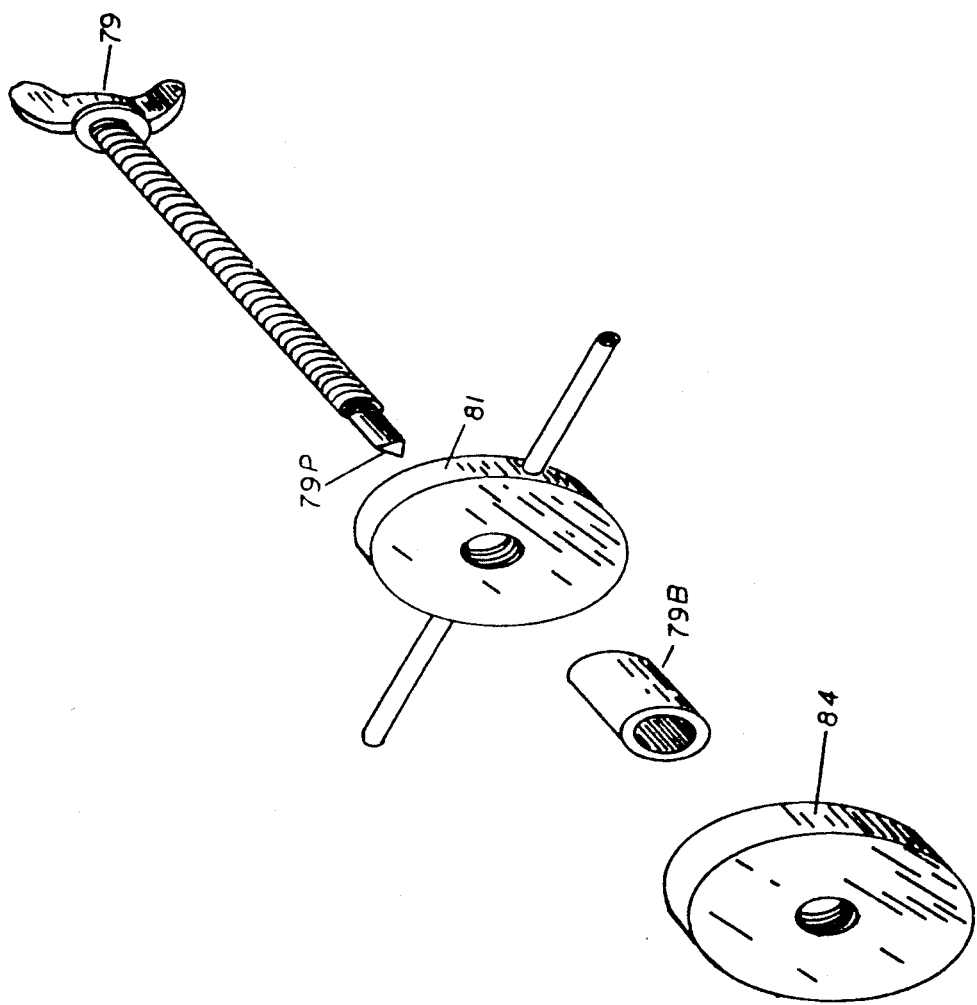

AUTOMOTIVE WHEEL BALANCING APPARATUS AND METHOD

This application is a continuation of application Ser. No. 07/139,124 filed Dec. 23, 1987, now U.S. Pat. No. 5,025,662; which is a continuation of application Ser. No. 06/502,986 filed Jun. 10, 1983, abandoned; and is a substitute of application Ser. No. 06/846,782 filed Apr. 1, 1986, abandoned; which is a continuation of application Ser. No. 06,502,986.

BACKGROUND OF THE INVENTION

For as long as the automobile has been with us there are many aspects of its design and maintenance that are still not well understood by the people (even engineers) who have to dealt with them. (One of the reasons why progress in this field has been so painfully slow.) Typical of these neglected factors is the importance of road wheel balance.

Equipment capable of properly balancing wheels is complex and expensive—consequently not commonly available. Even then, the principles are often not properly understood by the mechanics who use them so that the results are compromised.

It is no wonder that the average vehicle owner has become accustomed to an unnecessary level of roughness in the road performance of his car which he accepts as normal —even to the point where it is dangerous to handling. These conditions also cause accelerated wear on tires and vehicle suspensions.

Driving along a motorway it is surprising the number of cars where one observes one or more wheels whose vibration is noticeably visible. Of course, detrimental performance occurs far below the point of external visibility.

In fact, wheels should be balanced to a high degree of precision and then rebalanced after a significant amount of tire wear has occurred, say 5 to 10 thousand miles or, of course, whenever a tire has been remounted on a wheel for any reason, such as repair of a puncture.

Of all the components of the running gear of an automobile, wheels and tires are the least precise. Due to the manner of their manufacture they are dimensionally relatively crude devices. The assembled combination can quite normally give lateral and radial run out of as much as 1/16 inch (permitted by industry standards) and even ⅛ inch is not uncommon. For this and other contributory reasons intrinsic to the manufacturing methods employed, the possibility of very large mass imbalances must be expected and, indeed, do occur in practice. Consequently, the wheel/tire combination must be properly balanced, laterally and radially, before mounting on the vehicle and putting it in use.

To be properly balanced, a wheel must be in a state of equilibrium in two respects:

1) The distribution of the mass of the wheel must be perfectly concentric about its axis of rotation. (Radial balance—sometimes referred to as "static" balance.)

2) The rotational plane of the mass must be exactly perpendicular to the axis of the rotation. (Axial balance—sometimes referred to as "dynamic" balance.)

The effect of radial imbalance is to cause the wheel to vibrate vertically, or bounce as it rotates. Axial imbalance is felt as angular steering wheel vibration—sometimes referred to on the front wheels as "shimmy".

Both of these conditions, in addition to being unpleasant for the driver and passengers, reduce the effectiveness of tire adhesion to the road. Therefore, under marginal conditions of rain, snow and ice at road speed they can also be very dangerous.

Because of the precision with which the balancing must be carried out, it is a difficult problem to solve in a practicable, manageable way. It also requires precision manufacture of the mounting and locating surfaces on the vehicle—something which the more advanced and knowledgable automobile manufacturers are now doing. For example, 0.005 inch radial offset from true center is approximately equal to a ½ oz. weight at the wheel rim. This degree of imbalance is perceivable on most cars. Therefore, a maximum combined error which includes the tolerances on the vehicle wheel mounting and the balancing machine should be substantially less than 0.0025 inch.

Put another way, it must be possible to reliably detect, measure and correct a small imbalance in the radial plane acting at a minimal radius of 7 inches to an accuracy of 0.03% of the wheel mass (a static torque of about 2 inch ounces). The axial balance accuracy requirement can be similarly stated as a 2 to 3 inch ounce static torque correction (dynamically the magnitude of this torque couple is, of course, a function of wheel rotation velocity).

All wheel balancing methods attempt to sense the amount of mass imbalance and to compensate by the installation of properly located increments of weight of the required amount fastened to the wheel rim.

There are three general classes of equipment in common use for this purpose:
1) Bubble balancers;
2) "On the vehicle" spin balancers;
3) Wheel spin balancers.

Only machines in category (3) are capable of satisfactory results.

Bubble balancers are widely used because they are inexpensive. However, they are very inaccurate and hopelessly confuse the effects of the two types of mass imbalance. They can, therefore, provide only a very coarse correction which is normally far outside the requirements for acceptable road performance.

Machines in category (2) attempt to balance the wheels while installed on the vehicle. One of the justifications for this technique stems from the fact that some manufacturers do not adequately control their wheel locating dimensions. However, it can be readily shown that it is theoretically impossible to separately detect and measure the two components of imbalance using this method. Nevertheless, in practice it is possible, with sufficient patience, to achieve compromise conditions which represent some improvement. Of course, the wheels so treated must not be removed and remounted in another location. This type of balancer must also be considered to be unsatisfactory.

There are a number of different types of category (3) machines. Basically, they all operate on theoretically sound principles. In one way or the other they properly sense the two components of imbalance and provide for their appropriate correction. However, these machines are large, heavy, complex and expensive. Consequently, they are out of the financial reach of the largest sectors of the automobile service industry. Moreover, some, by their design, are susceptible to large operator errors so that their inherent accuracy is often not realized in practice. But, when properly used, the better machines in this category represent the standard by which other methods should be compared. However, most such machines require that the wheel be driven at relatively high rotational speeds to generate out of balance forces which are measured to provide an indication of imbalance weight and position (e.g., see U.S. Pat. No. 3,910,121).

In my U.S. Pat. No. 3,847,025 I disclose a dynamic wheel balancing method and apparatus in which the wheel is mounted in a pivoted cradle mechanically coupled to a maximum displacement indicator. The measurements of wheel imbalance and location were all mechanical and locating of the placement points for the weights was by trial and error.

Jackson U.S. Pat. No. 4,007,642 discloses a system using piezoelectric load cells to detect imbalance of a rotating wheel; Hale et al. U.S. Pat. No. 3,527,103 also drives a wheel at relatively high rates of speed to detect radial deviation to locate tire imperfections; Newkirk U.S. Pat. No. 1,557,268 discloses a pivoted cradle having an axle for rotating a body about an axis transverse to the cradle pivots and a long arm to an indicating scale indicates the amplitude of imbalance.

Other prior art is as follows:
Meredith U.S. Pat. No. 2,442,308
Silver U.S. Pat. No. 3,077,781
Trimble U.S. Pat. No. 3,147,624
Frank et al. U.S. Pat. No. 3,812,725
Finch et al. U.S. Pat. No. 3,991,620
Ito U.S. Pat. No. 4,011,761
Harant U.S. Pat. No. 4,149,416
Kogler et al. U.S. Pat. No. 4,173,146

THE PRESENT INVENTION

The object of the present invention is to provide a new type of wheel balancer based on a novel principle, the execution of which exploits the advantages of modern semiconductor electronics. The result is a machine of extremely low manufacturing cost with a number of advantageous operating features compared to the large, complex, heavy, immovable and expense category (3) machines disclosed in the art and presently marketed for this purpose. It, therefore, can bring an accurate wheel balancing capability within the financial reach of smaller repair shops, service stations, farmers, auto hobbyists and other such groups.

According to the present invention there is provided a cradle which is pivotally mounted on a support stand for rotation about a first axis. The frame also has a precision spindle upon which the wheel to be balanced is placed so that the wheel can be hand-rotated or spun at very low speed about a second axis which is at an angle to the first axis so where the wheel is rotated at low speeds (by hand) the frame oscillates between maximum and minimum amplitudes determined by the imbalance. A transducer constituted by a coil on the stand and a magnetic member on the frame produces a first electrical signal that is proportional to movements of the frame about the first axis. The first electrical signal is detected and the maximum amplitude stored, and the location of imbalance is electrically derived from this first signal. An indicator indicates the amplitude of any axial imbalance and the location thereof with respect to the wheel mounted in the frame. An indicator light rotated with the wheel indicates the location on the wheel where the weight should be added.

BRIEF DESCRIPTION OF THE DRAWINGS

The above and other objects, advantages and features of the invention will be better understood by referring to the following detailed description when considered in conjunction with the accompanying drawing wherein:

FIG. 4 is a side elevational view of the indicator assembly and spindle assembly with a wheel and tire mounted on the spindle for balancing;

FIG. 5 is a sectional view showing the electrical connection to the rotating indicator;

FIG. 12 is a sectional (partial) side view of the wheel locating tool;

FIG. 13 is a partial top plan view of FIG. 12;

FIG. 14 shows the detail of the centering screw assembly used in the wheel locating tool.

DETAILED DESCRIPTION OF THE INVENTION

Figure 1:
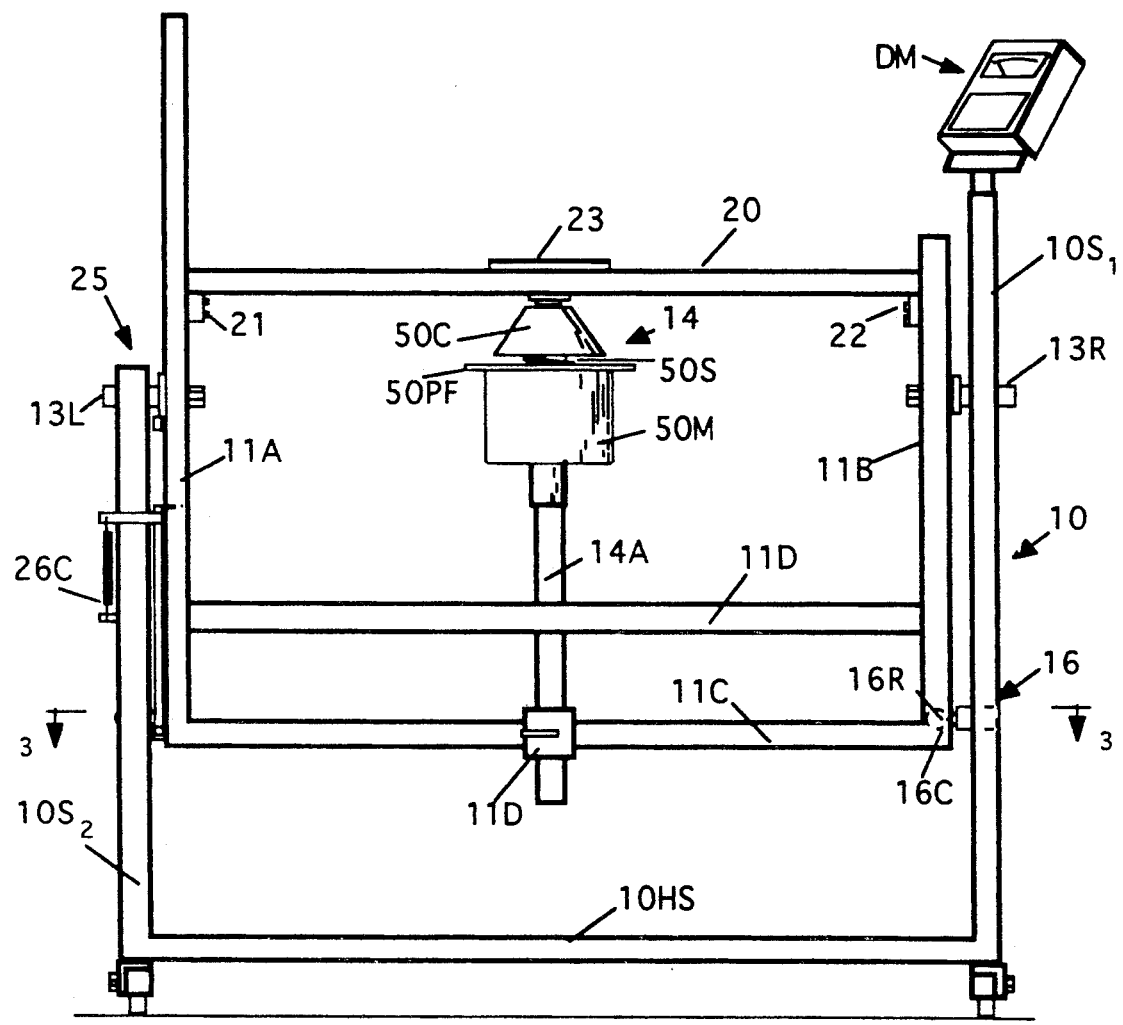
FIG. 1 is a front elevational view of a wheel balancer incorporating the invention.
Figure 2:
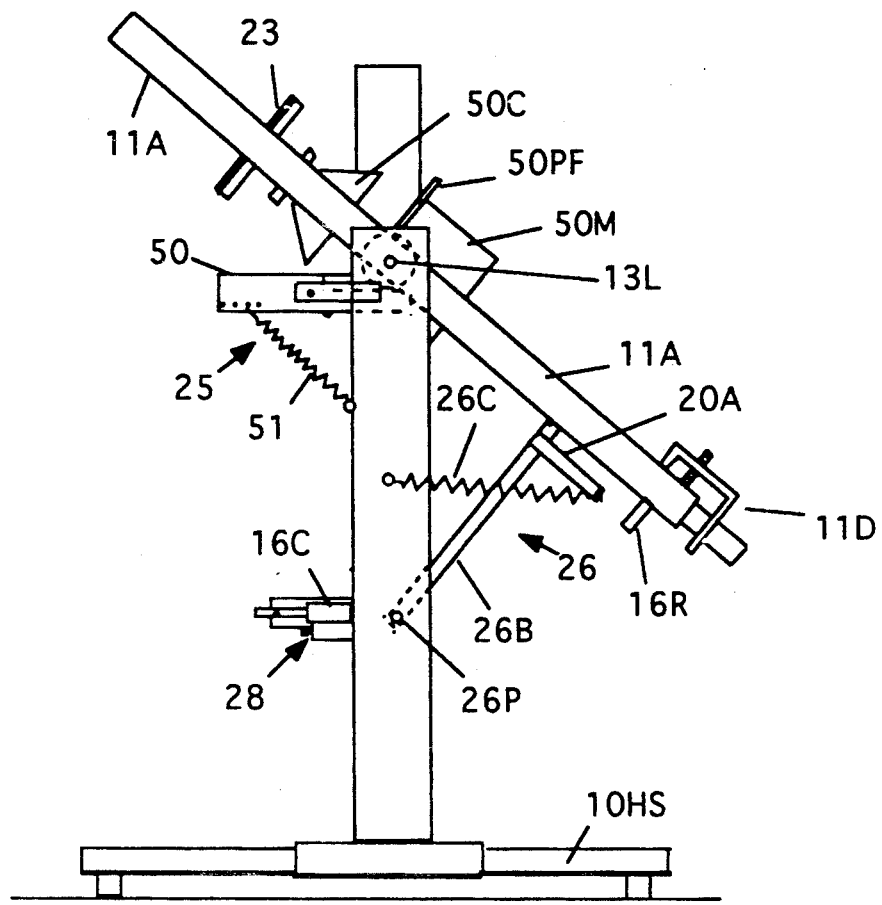
FIG. 2 is a side elevational view thereof.
Figure 3:
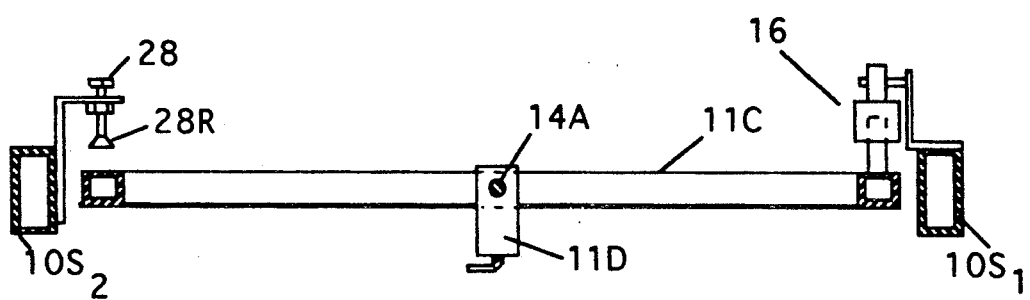
FIG. 3 is a sectional view on lines 3—3 of FIG. 1.
Figure 6:
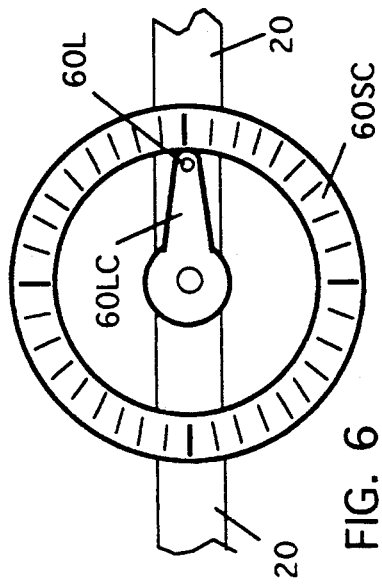
FIG. 6 is a top view of the indicator.

Referring to FIGS. 1-3, the wheel balancer includes a simple steel frame 10 which suspends a welded steel cradle 11 on ball bearing pivots 13. The cradle 11 holds a precision spindle assembly 14 for accepting and very accurately positioning the wheel with respect to both aspects of wheel mounting (radial run out and axial normality). Its vertical orientation circumvents a common source of operator error common to virtually all category (3) machines.

This spindle and cradle assembly 14 with a wheel positioned on it forms a very sensitive compound pendulum. The motion of the pendulum is sensed by a simple magnetic transducer 16, located at the bottom right (FIG. 1) of the frame 10.

Steel frame 10 has a pair of upright standards $10S_1$, $10S_2$ secured to horizontal stabilizing subframe 10HS. Wheel cradle 11 has a pair of side members 11A and 11B joined by a pair of spindle assembly support bars 11C and 11D for clamping shaft 14A of spindle assembly 14 in different height adjustment positions. An indicator support bar 20 is removeably supported by brackets 21 and 22 on side members 11A and 11B. The indicator 23 is centered over the axis of spindle assembly 14 and, as described later, is tethered to the wheel via the air fill valve stem of the tire. Transducer 16 includes a coil 16C mounted on the frame member $10S_1$ and a magnetic steel core element or bar 16R on wheel cradle 11 so that relative movement between coil 16C and core element 16R induces a voltage in the coil.

Damper assembly 25 including the residual damper worker 25W (shown in detail in FIGS. 8 & 9) controls the "Q" of the mechanical assembly.

Cradle stowing assembly 26 is provided to secure the cradle 11, with a wheel to be balanced carried on the spindle assembly 14, at about a 45° angle to check for radial imbalance. A stow lever 26B is pivoted at one end on pivot 26P on standard 10S₂ and engages cradle 11 at its opposite end. An arm 20A is connected by chain 26C to standard 10S₂ so as to limit the downward movement of stow lever 26B. Excessive rearward cradle movement is limited by an adjustable stop 28 (see FIG. 3).

SPINDLE ASSEMBLY

As best seen in FIG. 4, the spindle and wheel centering assembly includes a cone 50C rotatably and slidably centered on spindle shaft 14A biased upwardly by spring 50S, acting between the bottom of cup shaped member 50M and the base of cone 50C. Cup shaped member 50M is rotably supported on spindle shaft 14 by bottom bearing element 50B received in recesses 50R. Cup shaped member 50M has a peripheral wheel supporting flange 50PF. Cone 50C passes through wheel hole WH and accurately centers the wheel such that the rotary axis thereof is aligned with the axis of spindle shaft 14A and compresses spring 50S such that a substantial portion of the weight of the wheel W rests on peripheral flange 50PF.

Since the wheel W merely rests on peripheral flange PF, various wheel accessories such as wire wheel covers, nut locks, etc., can be secured to the wheel W and the wheel and accessories balanced as they would be installed on the vehicle. Principles of this spindle arrangement can be applied to large and small automobile tires as well as to truck tires.

INDICATOR ASSEMBLY

The position of the weight(s) to be added on the wheel is indicated by a light, such as a light emitting diode rotated synchronously with the wheel W. According to this aspect of the invention, insulated lamp carrier 60LC is rotably mounted in brass bushing assembly 60BA on indicator bar 20. The lamp 60L is at the end of lamp carrier 60C and rotates adjacent (or under) scale 60SC which is carried by transparent plate 60TP on indicator bar 20. Electrical connections to lamp 60L are by connectors from the lamp 60L terminals to a ground or a common conductor 60CG electrically connected to brass bushing 60BA and through the indicator arm 20 to the electrical circuit shown in FIG. 11A and FIG. 11B. Another connection at the base of lamp 60L connects to conductor 60CC and brass point contact button 60CB and connects to terminal 60T which has lead wire 60LW connected thereto leading to the electrical circuit shown in FIG. 11A and FIG. 11B.

The lower end of shaft 60SA has towing ring 60TR secured thereto, and stiff brass wire hook 60BH extends outwardly and downwardly from towing ring 60TR. As shown in FIG. 4, a tow line T has a tow ring TR at the end thereof which is slipped over the value stem V of the wheel.

Figure 7:
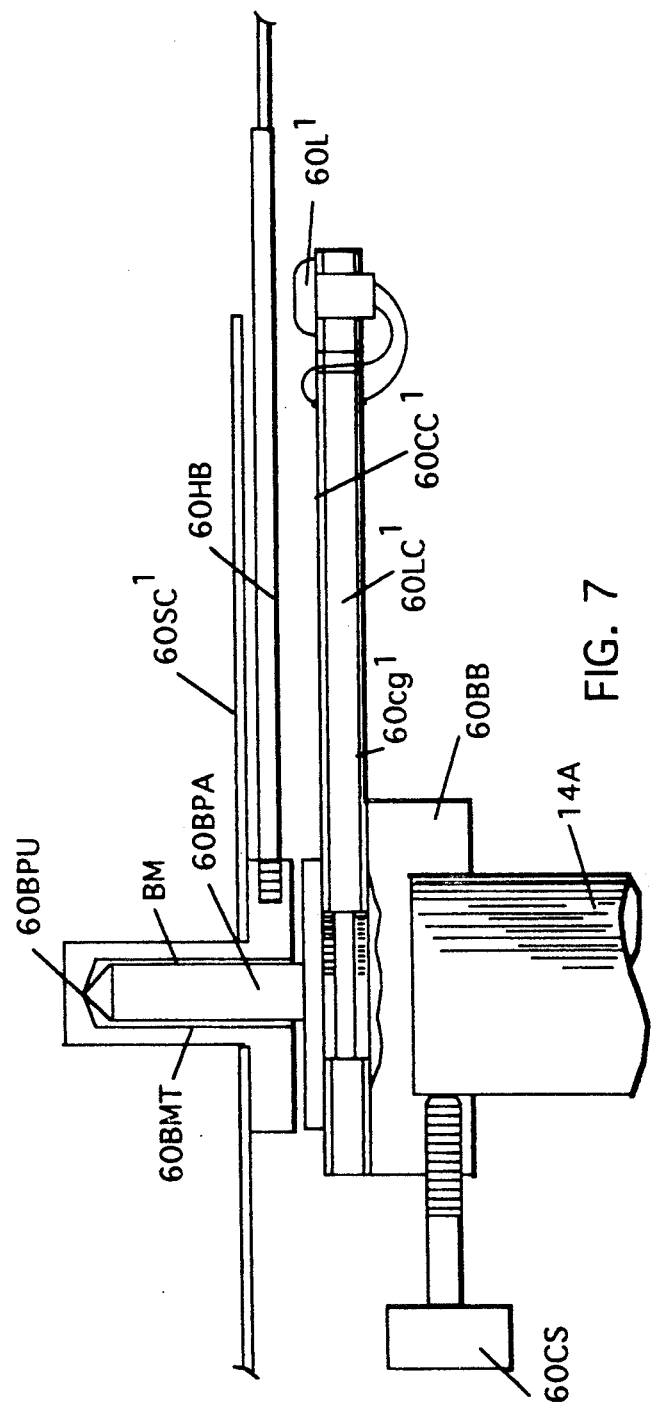
FIG. 7 is a sectional view of a modification of the indicator assembly.

An alternative way of synchronizing rotary movement of the indicator light 60L with wheel W is illustrated in FIG. 7. In this embodiment, the spindle shaft 14A is journaled for rotation in bearings (not shown) in frame number 11C and 11D and cup member 50M (not shown in FIG. 7) is secured to shaft 14A so as to rotate same when the wheel W is rotated. Lamp carrier 60LC is secured to the upper end of spindle shaft 14A by clamp screw 60CS in brass block 60BB to which lamp carrier 60LC is secured and in electrical connection with lamp ground conductor 60CG. A brass point indicator disc bearing 60BPA is secured to the upper surface of lamp carrier 60LC' and in electrical connection with lamp conductor 60CC.

Stationary transparent indicator disc 60SC' has conductive brass bearing member 60BM secured thereto, the internal bore 60 BMI making electrical contact with the upwardly projecting arm 60BPA, the upper pointed end 60BPM forming bearing between the rotating lamp carrier 60LC' and stationary indicator disc 60SC'. A conductive connection is made to conductive brass member 60BM by rigid brass rod 60HB, which is connected by a conductor to the electrical circuit shown in FIG. 11A and FIG. 11B. In this embodiment, the total assembly is placed on the end of shaft 14A and clamped with clamp screw 60CS after the wheel is placed on the balancer. Clearly, one would not go beyond the invention by using other more elaborate means of synchronizing the position of the lamp with wheel movement and it is intended that all such synchronizing techniques be encompassed herein.

THE ELECTRICAL CIRCUIT

Figure 10:
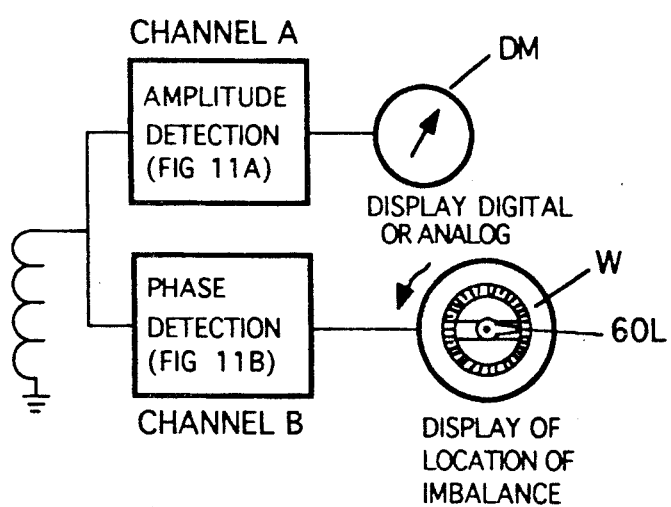
FIG. 10 is a schematic block diagram of an electrical circuit incorporating the invention.

As the wheel rotates, any imbalance will cause cradle 11 to track the imbalance and oscillate about pivots 13L and 13R thereby oscillating magnetic element 16R in non-loading linear velocity transducer coil 16C to thereby induce a voltage in coil 16C, the amplitude of which is proportional to the axial imbalance of the wheel and the frequency is proportional to wheel rotational velocity. Since the wheel cradle 11 combination constitutes a relatively high Q resonant system (when the damper bar is released) driven at a frequency above its natural resonant point, the output signal is very close to 180° out of the phase with the imbalance driving force. A simplified block diagram is shown in FIG. 10 wherein channel A (shown in detail in FIG. 11A) includes circuits amplifying and detecting the maximum or peak amplitude of the error signal voltage induced in the transducer coil 16C and channel B (shown in detail in FIG. 11B) includes circuitry detecting the signal phase relative to wheel rotation position to locate the point of mass imbalance. The signal from transducer 16C is amplified and peak detected in circuit element AD and the output applied to a display, such as display meter DM. The signal from transducer 16 is also amplified, filtered and the phase thereof relative to wheel position detected inphase detector PD and the output thereof is supplied to indicator light means 60L, which indicates or locates the mass imbalance on the wheel itself.

Figure 11A:
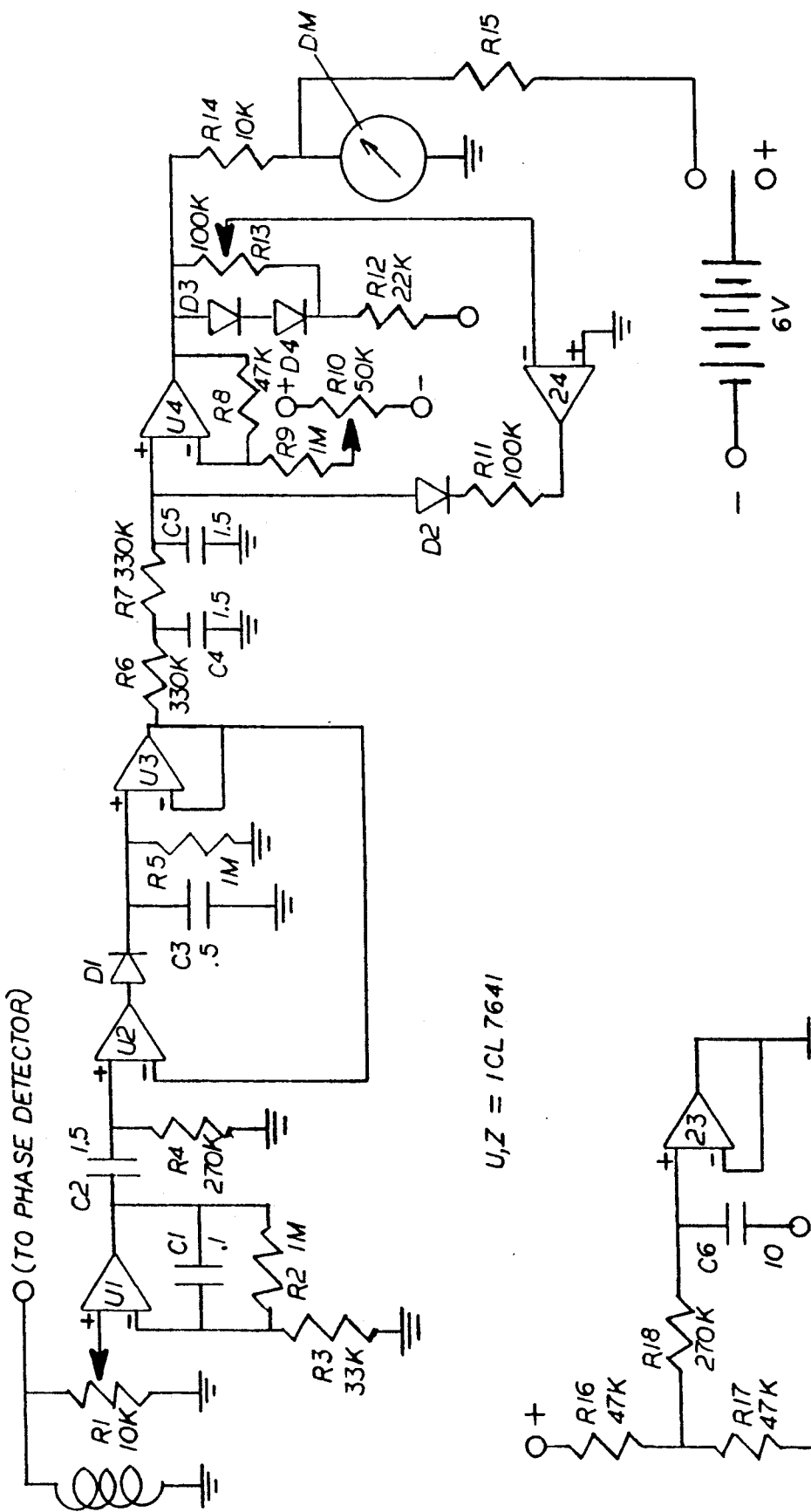
FIG. 11A is a circuit diagram of the amplitude detector.

Referring to FIG. 11A, signals from transducer 16C are coupled through potentiometer R1, to IC amplifier Ul-1, which is frequency equalized by capacitor C6 and resistors R10 and R11 to eliminate the effect of variations in wheel rotational velocity. The amplitude is detected and held by IC amplifier Ul-4, diode CR-1, and capacitor C2, IC operational amplifier Ul-3 and the long time constant filter comprised of capacitor C3 and C4 and resistor R4, operational amplifier Ul-3 being a high input impedance/low output impedance for this filter. The resulting DC voltage is applied to meter driver IC operational amplifier, Ul-2, the output of which is applied to display meter DM through resistor R15. Resistor R10 is a zeroing adjustment for meter DM and diodes CR-3, CR-4, and IC 0 amplifier U2-4, potentiometer R5, resistor R6 and diode CR-2 constitute a circuit means for limiting the meter DM indication to full scale in the presence of excessive input signals. Large transients can occur whenever cradle 11 is perturbed. This circuit limits the meter deflection to the value set by R13 (normally full scale) and dumps the excess energy from the filters. Resistor R16 couples the battery to meter DM through switch S1.

The power supply comprises 4 "D" cells providing approximately 6 volts, which can obviously alternatively be supplied from an AC supply and converter. All operational amplifiers must operate with two equal plus and minus voltages. This is provided by operational amplifier U2-3 which derives an accurate low impedance zero voltage. The filter comprised of resistor R18 and capacitor C6 prevent any transient disturbances on the supply rails from appearing on the zero rail.

Figure 11B:
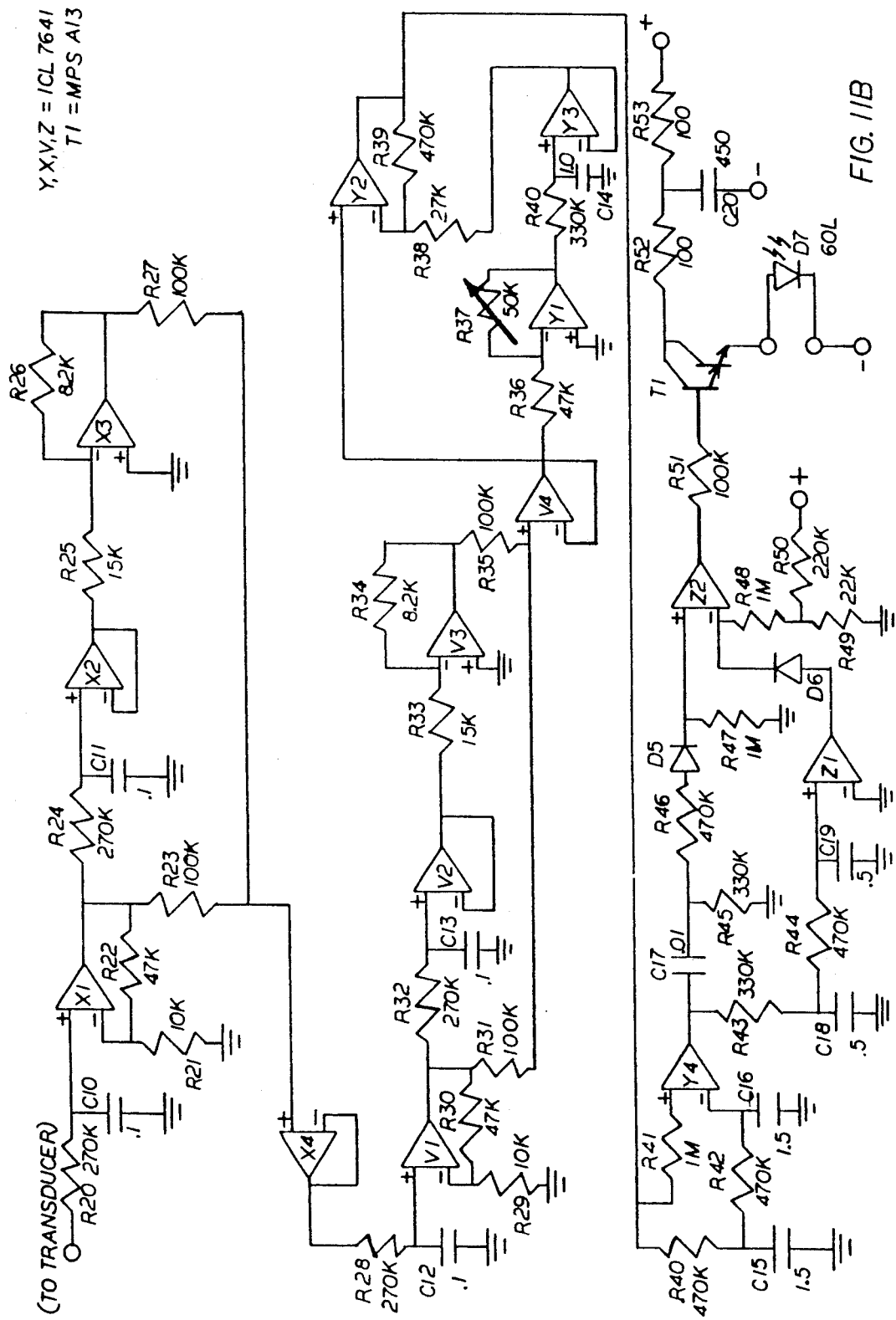
FIG. 11B is a circuit diagram of the phase detector connected to the transducer shown in FIG. 11A.
Figure 15:
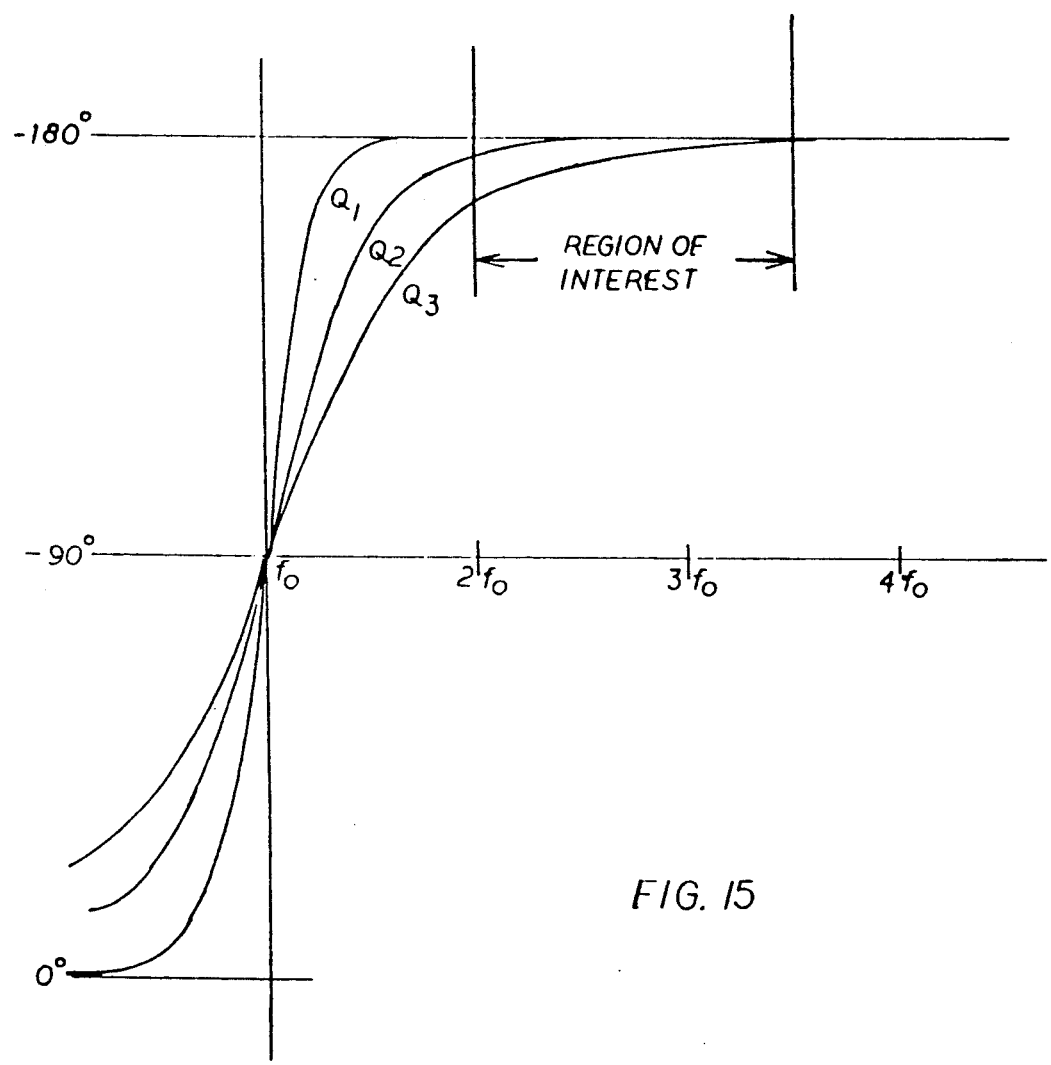
FIG. 15 is a graph showing the relationship between the frequency of oscillation and phase for a resonant mechanical system with different values of "Q" when driven above its natural resonant frequency ($f_o$).

Up until now there was no satisfactory way of doing anything about mechanical based produced noise at the input of the phase detector because of the phase shift of known type of filters. The present invention incorporates a very novel filter, which has essentially zero(-phase shift over the lower half of its passband. As shown in FIG. 11B, the filter comprises single identical 6 DB slope sections in series. The first such section includes the circuitry surrounding amplifiers U3-4 through U3-1. The input of amplifier U3-4 has a familiar RC-6 DB slope filter (R27, C10) at its input. The output of U3-4 then passes through a second filter (R39, C13) to U3-1, through an attenuator consisting of R-41 and R-42, an inverter U3-2 and is mixed with the output of U3-4 at the input of U3-3 via resistors R43 and R29. The filter section R-39 C-13 which is identical to R-27 C-10 has the property, when added out of the phase at the proper amplitude, of very nearly cancelling out the phase shift of R-27 C-10. In fact, it would exactly cancel this phase shift if there was not some slight amplitude attenuation over the passband which creates a small error. The key factors here are the two filter section which track each other (the R-27 C-10 and R-39 C-13 sections) and the amplitude of the output of R-27 C-10 which is added to the output of U3-4. This coefficient of amplitude optimizes at the value of approximately 0.55 which is determined in this circuit embodiment by the gains of U3-1, U3-2, and the R-41, R-42 divider. Consequently, there is a zero delay filter over the first half of its passband. The second half of its passband is of little interest in this application since the object is to contain the total phase shift over the operating band to the neighborhood of one degree per section. The second filter section includes the circuitry surrounding amplifiers U4-1 through U4-4.

The phase equalization network at the input of U5-2 permits it to limit at higher signal levels, consequently increasing the level to the self balancing zero crossing detector U5-3 and improving its accuracy as well as doing away with the need for any offset adjustments at low levels. The phase equalization network (U5-4, U5-1, and associated circuitry) is combined at the input of U5-2 with the normal signal and operates to provide an increasing positive phase shift with decreasing frequency. This is exactly the opposite of what normally occurs in any kind of an RC network. R37 provides an adjustment of this phase shift from 0° to approximately 15° at 1 Hz. U5-3 is self balancing because its DC inputs through R-49, R-37, and R-48 are all tied together at the output of U5-2 so that any DC drift preceding this point is automatically cancelled out and U5-3 maintains essentially perfect balance for signals at all levels.

The output from U5-3 is a square wave whose transitions are the zero crossings of the transducer signal. A differentiator (C12, R24) generates a narrow spike at the square wave transition (zero crossing) points the negative to positive transition is passed by resistor R23; diode CR6 to U2-1. The filter circuit constituted by filter (R38, R21, C7, and C8); comparator U2-2 and diode CR5 form a gate at the input of U2-1 to block the operation of U2-1 except for a small window in the region of the negative to positive output from the differentiator. This provides a large measure of protection of U2-1 by noise when the transducer error signals are very small Resistor R18 couples the output of U2-1 to the base of transistor Q, which has the collectors thereof connected to +3 volt supply via a filter (R17, R32, and C9) and the emmiter to the indicating lamp LED 60L, which has the opposite side thereof connected to −3 volt supply.

Exemplary integrated circuit components and values of resistors and capacitors are set forth in the circuit diagram of FIG. 11A and FIG. 11B.

THEORY AND APPLICATION OF DAMPER

Figure 8:
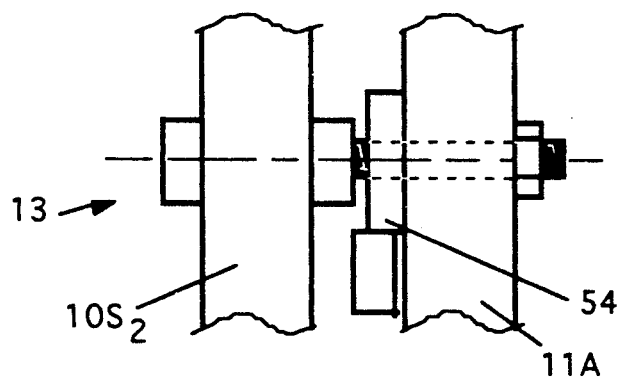
FIG. 8 is an enlarged elevational view of the damper assembly.
Figure 9:
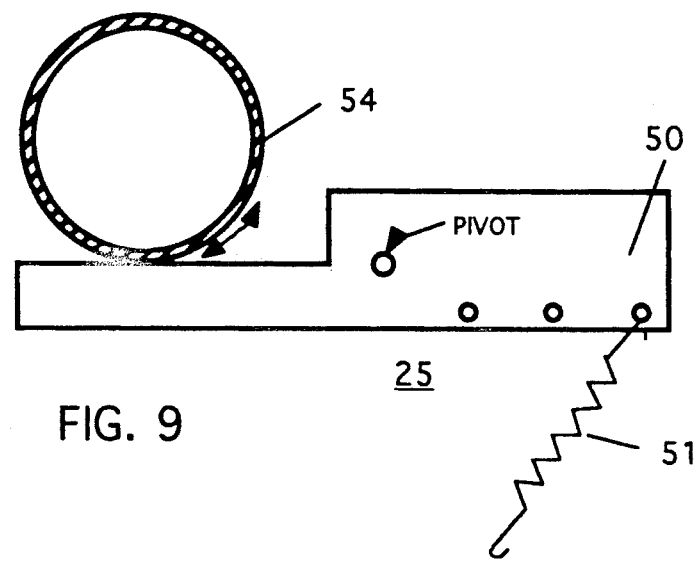
FIG. 9 is a partial side view of the damper shown in FIG. 8.

A very simple friction damper has been included to control the "Q" of the mechanical assembly. As shown in FIGS. 8 and 9, it includes a short aluminum damper bar 50 which bears on the left hand cradle pivot 13L. It is loaded by spring 51 to provide about 1 lb. of force on the pivot 132. This is not a critical-parameter. Damper bar 51 is pivoted at 52 on frame member 11A, and has a series of holes 53 for adjusting the connection of spring 51 to the bar and hence adjust the damping force exerted by the friction between material 54 and the bearing carrier 13C mounted cradle 11. Without appropriate damping, cradle 11 may take too long to stabilize in phases during each test spin and its amplitude will be unstable since a very high Q mechanical system resists being driven at frequencies other than fo. On the other hand, too much damping introduces too much phase shift between cradle 11 displacement signal and the imbalance driving force.

In practice, the damper bar 50 is set to provide relatively high damping to provide rapid settling and very stable amplitude reading. To eliminate the phase error associated with this condition, the damper bar is released for the phase measurement by pushing down on the damper level DL. A small amount of residual damping is retained by the dish shaped damper washer 25W to maintain a stable phase measurement while at the same time contributing negligable error. These two damper settings are not critical and can vary over a wide range.

ALTERNATIVE MEANS OF WHEEL LOCATION

Some automobile manufacturers do not yet use the center hole of the wheel as a means of accurately locating the wheel on the vehicle axles, but instead depend upon the wheel mounting studs to both locate and secure the wheel. This introduces the possibility of wheel location error due to manufacturing tolerances on stud and hole locations.

Until now there has been no practicable way to compensate for these tolerance errors so that, a wheel can be balanced in the same radial location as it will run on the vehicle and consequently achieve a true balance.

This alternative wheel locating tool is shown in FIGS. 13 and 14 and operates in conjunction with some of the special features of the balancer to solve this problem. It utilizes the center hole of the wheel axle (not shown) as a means of identifying and retaining the true reference center about which the wheel rotates on the vehicle. This center hole is a very accurate reference since it is the axis about which the axle, and in particular its bearing surfaces were machined.

Wheel center locating tool 75 includes a clamp support bar 76 having a pair of wheel rim clamp assemblies 78 (only one shown) for clamping to the wheel rim and a centering screw assembly 77. Centering screw assembly 77 has a pilot bolt 79 passing through a bushing 79B in a large hole 80 in support bar 76, top nut 81 having a pair of pins 82 is threadably engaged with threads 83 on pilot bolt 79. Square plates 84 and 85 are welded to bar 76 and have their outer surfaces 84S and 85S milled exactly parallel to each other. Bottom nut 86 is threadably engaged with threads 82 on pilot bolt 79.

Rim clamp assemblies 78 include an angled bar unit 90 to which is welded a clevis member 91 straddling the end of support bar 76. A pin 92 passes through one of adjustment holes 99 and a hinged adjustment screw 93, threadably engaged with one of the threaded bores 94 in support bar 76 bears on angled bar unit 90 to cause it to pivot on pin 92 urging rim R engaging ends of angled bar unit 91 to engage the rim. A pair of spaced adjustment screws 95 and 96 are carried at the ends of rim engaging member 97 which has a pair of hard sharpened points 98 which engage the rim R. Adjustment screws 98 assure that the tool 75 mounts perpendicular to the rim R.

In use, the tool 75 is installed on the wheel before the wheel bolts are loosened. This is done by holding the tool against the wheel rim R and turning the centering screw 79 until the point 79P just engages the axle center hole. The two adjusting screws 93 are then carefully tightened to expand the tool against the wheel rim R to lock it in place, but in such a way that the tool is not forced off center to any noticeable extent. The centering screw 79 is then withdrawn from the tool completely and reinstalled without the bushing 79B. The centering screw is turned carefully into the wheel center operating against the bottom nut 84. The large diameter of this nut and the accurately machined surface of the tool will cause the screw 79 to very accurately center itself against the axle center hole. The top nut 81 is then spun down against the top surface of the tool to lock the centering screw in position. In this manner the true center about which the wheel rotates has been very accurately located.

One of the mounting studs and its corresponding wheel hole are marked by any suitable means such as a dab of paint and the wheel is removed from the vehicle.

The wheel is mounted on the balancer and the balancing is accomplished in the same manner as previously described except that in this case the spring loaded cone is replaced by a spring loaded disc which has a small tapered hole to accept the point 79P of the centering screw 79 which now becomes the radial reference in place of the wheel center hole.

After balancing, the wheel must be replaced on the vehicle in the identical position from which it was removed as indicated by the previously marked stud and it may not then, or subsequently be mounted in any other location without repeating the balancing operation for the new location.

METHOD OF OPERATION

The first operation is to correct for radial imbalance. This is done by lifting cradle 11 45° and securing it in position by the stowing lever 26 on the left side of the frame as shown in FIG. 2. In this position, 70% of the unbalanced concentric force fo the wheel is operative causing it to rotate to a point where this force is at the bottom. A weight of the proper value may then be placed at the top of the rim so that the wheel can be rotated to any position and remain stationary. Forces as small as 10 grams (at the wheel rim) may be detected and compensated in this manner.

Having completed this operation, radial balance has been accomplished and the cradle 11 is restored to its original freely suspended vertical position. The indicator bar 20 is then put in place and the line 100 which tows the indicator is slipped over the valve stem 91 of the tire.

Grasping the upright at the leg top of the cradle 11 and pulling it forward to hold the cradle against the rubber stop, the wheel W is spun with the right hand (about 1 to 2 RPS).

Releasing the cradle 11, it is now free to oscillate at an amplitude and rate which is driven by the existing axial imbalance. The amplitude of the imbalance is indicated by the meter 94 and its location is indicated by the flashing LED 95 as it rotates past the circular scale 96 on the indicator bar.

The wheel is then stopped, rotated to the position where the indicator was flashing and a pair of weights of suitable value placed on opposite sides of the rim R. The top weight is placed opposite the zero position on the scale and the bottom weight on the bottom side exactly 180° opposite.

The wheel W is then respun and if the meter 94 is in the green region (0-1 on a 0-10 scale) the wheel may be considered to be axially balanced. Axial imbalance, as small as a pair of 10 gram (or $\frac{1}{4}$ oz.) weights, may be detected and corrected in this manner.

Because the sensitivity of this method is so high and the rotational velocities so low, the operation is aided by using trial magnetic weights in increments of 10 grams. When the proper values are verified by the meter reading, normal wheel weights are substituted and hammered in place. Thus, the entire two stage operation can be done very easily and quickly.

The horizontal position of the wheel eliminates the need (and time consumed) for separately fastening the wheel in place and the tapered cone provides a very accurate and foolproof method of achieving the very high standards of a concentric location. The electronics are powered b 4 "D" cells. The low current drain of 20 ma (av) gives very long battery life.

Advantages of the invention include:
1) Low Cost For the first time it brings precision wheel balance capability within reach of every individual or organization who has a need.
2) Portability Easily carried to any location for use. Can be stored out of the way when not in use. Bolting to the floor is eliminated. However, it is clear that the support frame 10 can be bolted to the floor if the advantage of portability is not required.
3) Safety The lower rotating velocity (1 to 2 RPS) eliminates a significant safety hazard inherent in present high RPM machines. The very low voltage, low current requirements eliminate all electrical hazards.

4) Magnetic Trial Weights Low Rotating velocities permit use of small magnetic trial weights to verify balance. Final wheel weights need be hammered into place only once.

5) Separation of Out of Balance Forces The machine separates the axial and radial components of imbalance. This can often be useful in problem diagnosis.

6) Compensation for Out of Tolerance Vehicle Mounting The separation of imbalance forces and the low rotating velocity permit compensation for tolerance errors in the vehicle/ wheel mounting. This can be done by measuring the radial and axial errors and appropriately shimming the cone fo the back ring. Usually the errors will be much worse in the radial plane. These can also be done, but in a much easier way, by use of the alternative wheel locating tool which compensates for radial errors without the need for explicit measurements.

7) Accurate Wheel Centering One of the biggest problems with all current designs is to accurately center the wheel on the machine. A few thousandths of an inch error introduces very large errors in the balance process. The horizontal wheel position and the spring loaded cone provide a very accurate, repeatable means of wheel location which eliminates this operator error factor.

8) No Wheel Fastening Positive fastening of the wheel to the machine is not required, thus saving labor and time as well as easing the use of the machine.

9) High Accuracy and Precision Due to factors intrinsic to the mechanical and electronic principles employed, the machine is capable of very high levels of precision and accuracy.

10) Removable Electronics The electronics package readily disconnects and lifts off to facilitate movement of the machine and safe keeping of the electronics when the machine is not in use.

11) Reliability The simplicity of the mechanics and the very low voltage stresses on the electronics enable a very high level of reliability.

12) Meter Protection A special meter protection circuit prevents damage to the meter and long recovery times due to inadvertently high inputs.

13) Balance Truck Wheels In this case, while the parts would be more robust, Frame 11 is mounted on a stationary support stand and the truck wheel lifted onto the spindle by a fork lift, crane, etc. Slower hand rotation of the wheel is possible since the mass lowers the resonant frequency.

14) Balance Wheels with Accessories Many car wheels have accessories, such as wire wheel covers, nut locks, etc., which can cause a balanced wheel to become unbalanced after they are added. In the preferred embodiment of the present invention, since the wheel merely rests on flange 50 PF of cup member 50M, and is not secured to the apparatus, the wheel can be accurately balanced with such accessories as wire wheel covers and nut locks on the wheel. In the case of nut locks, blind studs (shown dotted in FIG. 4) passing through the stud holes of the wheel to which the nuts and nut locks are temporarily applied during balancing.

While there have been shown and described and pointed out the fundamental novel features of the invention as applied to the preferred embodiment, it will be understood that the various ommissions and substitutions and changes in the form and details of the device illustrated and in its operation may be those skilled in the art without departing from the spirit of the invention. It is the intention, therefore, to be limited only as indicated by the scope of the following claims.

I claim:

1. A method for dynamically determining the imbalance of a combined wheel and tire for a motor vehicle, comprising the steps of:

mounting the wheel for rotation about a shaft having an axis of rotation;

statically balancing said combined wheel and tire, including placing said shaft at such an angel that any static unbalance will cause said wheel and tire to rotate to indicate the static unbalance;

manually rotating the wheel, allowing the wheel and shaft to coast and slow down to a rotational velocity in the range of from 50 to 100 rpm during a settling period;

electrically measuring the forces of imbalance transmitted by the wheel to said shaft at the termination of settling period;

electronically determining imbalance data related to the measured forces; and displaying the imbalance date.

2. The method of claim 1 wherein said settling period is the time it takes the measured forces to settle as determined by the difference in signals measured on successive revolutions of the shaft.

* * * * *